United States Patent [19]

Pappas et al.

[11] 4,156,061

[45] May 22, 1979

[54] EPOXIDIZED TERPOLYMER OR DERIVATIVES THEREOF, AND OIL AND FUEL COMPOSITIONS CONTAINING SAME

[75] Inventors: James J. Pappas, Parsippany; Norman Jacobson, East Brunswick; Edward N. Kresge, Watchung, all of N.J.

[73] Assignee: Exxon Research & Engineering Co., Florham Park, N.J.

[21] Appl. No.: 741,110

[22] Filed: Nov. 11, 1976

Related U.S. Application Data

[60] Continuation of Ser. No. 448,474, Mar. 6, 1974, which is a division of Ser. No. 337,460, Mar. 2, 1973, which is a continuation-in-part of Ser. No. 235,439, Mar. 16, 1972.

[51] Int. Cl.$^2$ .............................. C08F 8/08; C08F 8/32
[52] U.S. Cl. ...................................... 526/20; 526/52.4; 526/52.5
[58] Field of Search .................. 526/20, 52.4, 52.5

[56] References Cited

U.S. PATENT DOCUMENTS

| | | | |
|---|---|---|---|
| 3,409,592 | 11/1968 | Landua et al. | 260/47 |
| 3,448,174 | 6/1969 | Loveless et al. | 260/878 |
| 3,790,483 | 2/1974 | Song et al. | 252/59 |
| 3,842,010 | 10/1974 | Pappas et al. | 252/51.5 R |
| 3,864,268 | 2/1975 | Culbertson et al. | 526/52.4 |

FOREIGN PATENT DOCUMENTS

| | | | |
|---|---|---|---|
| 982077 | 2/1965 | United Kingdom | 526/499 |
| 1128825 | 10/1968 | United Kingdom. | |

*Primary Examiner*—William F. Hamrock
*Attorney, Agent, or Firm*—Frank T. Johmann

[57] ABSTRACT

Terpolymers of ethylene, a $C_3$ to $C_8$ alpha-olefin and a non-conjugated acyclic or alicyclic diolefin are epoxidized at sites of unsaturation which are extraneous to the main backbone chain of carbon atoms. Either the epoxidized terpolymer or the reaction products of the epoxidized terpolymer with reagents having replaceable hydrogen, i.e., water, organic acids, alcohols, amines, phenols, mercaptans and the like, are useful as multifunctional additives for synthetic and mineral oil lubricants and fuels.

3 Claims, No Drawings

EPOXIDIZED TERPOLYMER OR DERIVATIVES THEREOF, AND OIL AND FUEL COMPOSITIONS CONTAINING SAME

RELATED APPLICATION

This is a continuation of application Ser. No. 448,474, filed Mar. 6, 1974, which was a Div. of Ser. No. 337,460, filed 3/2/73, which in turn was a CIP of Ser. No. 235,439, filed 3/16/72.

BACKGROUND OF THE INVENTION

1. Field of the Invention

The present invention relates to epoxidized terpolymers and functional derivatives obtained therefrom and their use in lubricant compositions, for example, as sludge dispersants and viscosity index improvers. More particularly, the invention is directed to epoxidized terpolymers of ethylene, $C_3$–$C_8$ $\alpha$ olefins and non-conjugated dienes in which the chain of carbon atoms forming the terpolymer backbone is essentially saturated and any substantial unsaturation in the terpolymer, prior to epoxidation, is in an alkylene radical pendant to the backbone or is pendant to or part of a cyclic structure attached to the backbone. The epoxidized terpolymer may be further reacted with a functional reagent which is herein defined as a reagent having a replaceable hydrogen which will react with an oxirane in the presence of an acidic or basic catalyst to form a functional adduct. The oil-soluble epoxidized terpolymers or its functional adducts are useful as additives for lubricants, such as sludge dispersants and viscosity index improvers, and as sludge dispersants in mineral oil fuels, e.g., distillate fuel oil and gasoline.

2. Description of the Prior Art

Epoxidation of polymers of butadiene and copolymers of butadiene and styrene, in each instance of which a preponderant proportion of the unsaturation in the polymers is located in the chain backbone, has been described in U.S. Pat. No. 2,829,135 and in British Pat. Nos. 774,752 and 774,765. The resinous products obtained were useful in the formulation of surface coatings.

U.S. Pat. No. 3,388,067 is of interest in demonstrating the improvements of the present invention over the prior art. This patent describes the oxidation, preferably in the presence of a free-radical initiator, of an essentially saturated copolymer of ethylene and propylene at tertiary hydrogen sites located on the polymer backbone chain. Cleavage of the polymer chain occurs with the formation of hydroperoxidized segments of lower molecular weight polymer. Subsequent reduction of the hydroperoxidized segments yields a polymer hydroxylated on the backbone chain, useful as a viscosity index improver.

SUMMARY OF THE INVENTION

In contrast to the products of the prior art it has now been discovered that terpolymers of ethylene, one or more alpha monoolefins having from 3 to 8 carbon atoms, preferably propylene, and a straight or branched chain acyclic, or alicyclic non-conjugated diolefin, in which the unsaturation in the terpolymer, originating from the diolefin incorporated therein is extraneous to the main polymer chain and is either pendant to or part of a cyclic structure attached to an essentially saturated backbone chain, when epoxidized, or epoxidized and further reacted with a functional reagent having a replaceable hydrogen to form a functional adduct, yields products having the same chain length as the original terpolymer, which are useful as sludge dispersants, viscosity index improvers and acidity neutralizers when incorporated into lubricants.

Terpolymers, useful for formation of the epoxidized products of this invention contain at least 30 mol.percent, preferably not more than 85 mol.percent of ethylene; between about 15 e.g., 14.5 and about 70, e.g. 69.5 mol.percent of a higher alpha-olefin or mixture thereof, preferably propylene; and between 0.5 to 20 mol. percent, preferably 1 to 15 mol. percent, of a non-conjugated diolefin or mixture thereof. Especially preferred are polymers of about 40 to 70 mole % ethylene, 20 to 58 mole % higher monoolefin and 2 to 10 mole % diolefin. On a weight basis, usually the diolefin will be at least 2 or 3 wt. % of the total terpolymer. Structures of a number of useful terpolymers are illustrated below.

DESCRIPTION OF THE PREFERRED EMBODIMENTS

1. Terpolymers

Ethylene-propylene-non-conjugated diolefin terpolymers are well known articles of commerce. The preparation of typical terpolymers, using Ziegler-Natta catalysts, is described for example in U.S. Pat. Nos. 2,933,480; 3,000,866; and 3,093,621. These terpolymers, which are primarily produced for use in elastomeric compositions, are characterized by the absence of chain or backbone unsaturation and contain sites of unsaturation in groups which are pendant to or are in cyclic structures outside of the main polymer chain. These structures render the polymers particularly resistant to breakdown by atmospheric oxidation or ozone.

Useful terpolymers for the production of the epoxidized products of this invention comprise ethylene, a $C_3$ to $C_8$ straight or branched chain alpha-olefin and a non-conjugated diolefin. Representative non-limiting examples of non-conjugated diolefins that may be used as the third monomer in the terpolymer include:

A. Straight chain acyclic dienes such as: 1,4-hexadiene; 1,5-heptadiene, 1,6-octadiene.

B. Branched chain acyclic dienes such as: 5-methyl-1, 4-hexadiene; 3,7-dimethyl 1,6-octadiene; 3,7-dimethyl 1,7-octadiene; and the mixed isomers of dihydro-myrcene and dihydroocimene.

C. Single ring alicyclic dienes such as: 1,4-cyclohexadiene; 1,5-cyclo-octadiene; 1,5-cyclododecadiene, 4-vinyl-cyclohexene; 1-allyl 4-isopropylidene cyclohexane; 3-allyl-cyclopentene; 4-allyl cyclohexene and 1-isopropenyl 4(4-butenyl) cyclohexane.

D. Multi single ring alicyclic dienes such as: 4,4'-dicyclopentenyl and 4,4'-dicyclohexenyl dienes.

E. Multi-ring alicyclic fused and bridged ring dienes such as: tetrahydroindene; methyl tetrahydroindene; dicyclopentadiene; bicyclo(2,2,1) hepta 2,5-diene; alkenyl, alkylidene, cycloalkenyl and cycloalkylidene norbornenes such as: 5-methylene-2-norbornene; 5-ethylidene-2-norbornene; 5-methylene-6-methyl-2-norbornene; 5-methylene-6,6-dimethyl-2-norbornene; 5-propenyl-2-norbornene; 5-(3-cyclopentenyl)-2-norbornene and 5-cyclohexylidene-2-norbornene.

In general, useful terpolymers contain non-conjugated diolefins having 5 to 14 carbon atoms and exhibit viscosity average molecular weights ($\overline{M}v$) of from 10,000 to 1,000,000, e.g., 20,000 to 200,000, as determined in decalin solvent at 135° C. In addition, the molecular weight distributions of the useful terpolymers are preferably narrow, having weight average to number average molecular weight ratios of less than 15 and preferably less than 10.

Structurally, the terpolymers suitable for conversion to the epoxides and their functional adducts of the present invention may be illustrated for various non-conjugated diene monomers as random terpolymers in which the following moieties are linked in the polymer chain in a random sequence and in a varying number.

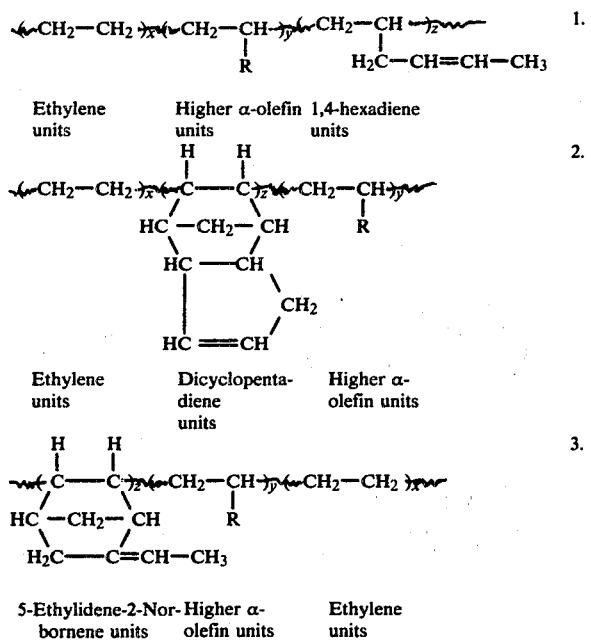

in which x, y and z are cardinal numbers, typically in the range of 1 to 100. While these terpolymers are essentially amorphous in character by superficial inspection, they may contain up to about 25 percent by weight of crystalline segments as determined by X-ray or differential scanning calorimetry. Details of these methods for measurement of crystallinity are found in J. Polymer Sci. A-2, 9, 127 (1971) by G. Ver Strate and Z. W. Wilchinsky. On epoxidation, an oxirane is formed at either all or part of the unsaturation, shown above as a double bond.

2. Epoxidation

While commercially available terpolymers, as illustrated structurally above having the requisite level of unsaturation and molecular weight may be used to prepare the epoxidized terpolymers of this invention, by dissolving the polymer in a suitable solvent before proceeding with the epoxidation, convenience and economies in operation may be effected by epoxidizing the terpolymer while it is in "cement" form, as it is normally recovered from the polymer synthesis. Since the media used for dissolving or dispersing the catalyst components and terpolymer reaction products in the Ziegler-Natta synthesis are also suitable for the epoxidation reaction, the use of a deactivated, polymer cement freed of catalyst residues, recovered from the synthesis reaction is especially attractive.

Suitable solvents may be selected from the general group of olefin-free petroleum hydrocarbons, aromatics and halogenated hydrocarbons. $C_{12}$ or lower, straight or branched chain saturated hydrocarbons are preferred, but $C_5$ to $C_9$ saturated alicyclic, or $C_6$ to $C_9$ aromatic hydrocarbons may be used with equal facility. Halogenated hydrocarbons having two to six carbon atoms in the molecule are also useful. Representative non-limiting examples include: pentane, cyclopentane, normal and isohexane, heptane, isooctane, methyl cyclopentane, benzene, toluene, mixed xylene, dichloroethane, trichloroethane, orthodichlorobenzene, and mixtures of the above.

Depending on the viscosity of the resulting solution and the reagent used to effect epoxidation, a concentration in the range of 1 to 10 percent by weight of terpolymer in solvent may conveniently be used for conversion of the terpolymer to epoxide.

A wide variety of reagents and techniques may be used for effecting the epoxidation of the preferred terpolymers. As an illustration of this, a partial list of reagents and techniques is described in "Organic Reactions", Vol. 7, page 378 by Daniel Swern, John Wiley and Sons, New York, 1953. The particular reagent or method used is one of economics and convenience and is not a limiting aspect of this invention and many variations from the examples shown below will be apparent to those having skill in the art. Typical reagents include: perbenzoic acid, meta-chloroperbenzoic acid, peracetic acid, trifluoroperacetic acid, monoperphthalic acid, performic acid, hydrogen peroxide-acetic acid, and hydrogen peroxide-formic acid.

Usually, from 10 to 100%, preferably 40 to 98% of the double bonds in the terpolymer will be converted to oxirane groups. Since it is uneconomical for practical purposes to attempt to convert all of the double bonds in the terpolymer molecule to an oxirane, the structure of one particular embodiment of an epoxidized terpolymer may be illustrated as follows:

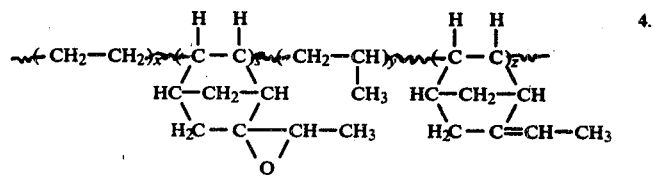

in which x is a cardinal number of from 1 to about 100 denoting an ethylene or poly(ethylene) moiety incorporated in the terpolymer chain; s is a cardinal number of from 1 to about 100 denoting an epoxidized 5-ethylidene-2-norbornene or an epoxidized poly (5-ethylidene-2-norbornene) moiety incorporated in the terpolymer chain; y is a cardinal number of from 1 to about 100 denoting propylene or a poly(propylene) moiety incorporated in the terpolymer chain; z is a cardinal number from 0 to about 100 denoting 5-ethylidene-2-norbornene or a poly (5-ethylidene-2-norbornene) moiety incorporated in the terpolymer chain prior to epoxidation; and the sum of s and z may be in the range of 1 to about 100. It will be apparent that the numerical values for s, x, y and z as used herein do not represent totals of any particular monomer unit in the terpolymer chain but are average values for any particular monomer present as a moiety in the polymer chain.

3. Functional Adducts of Epoxidized Terpolymers

Functional adducts of the epoxidized terpolymers of this invention may be readily prepared by reaction of the epoxidized terpolymer with a functional reagent in the presence of acidic or basic catalysts. Reaction of the oxirane with the nucleophilic reagent may proceed in two directions depending on the catalyst. In the presence of acidic catalysts, the oxirane is protonated, which may then readily react with a weak nucleophilic reagent; in the presence of basic catalysts, the unprotonated epoxide is readily attacked by the stronger nucleophilic reagent. In either case a difunctional compound results as illustrated below:

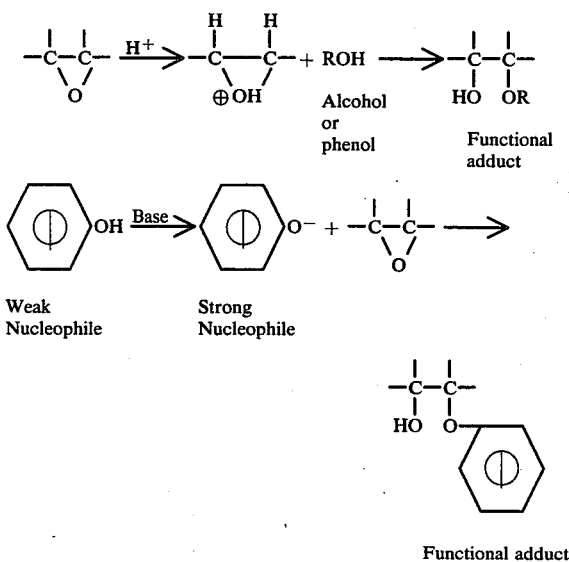

Non-limiting examples of suitable functional reagents are: water, $C_1$ to $C_{18}$ alcohols, $C_1$ to $C_{18}$ preferably $C_2$ to $C_{12}$ monobasic acids, $C_1$ to $C_{18}$ amines, $C_2$ to $C_{18}$ amides, phenol, thiophenol, alkyl phenols or thiophenol with 1 to 4 alkyl groups of 1 to 12 carbons each, $C_1$ to $C_{18}$ alkyl mercaptans, dialkylamino-phenols, N,N-dialkylaminoarylene diamines, alkyl imidazolines, aryl ether alcohols, alkyl ether alkylene amines and the like.

Further descriptions of preferred forms of some of these functional agents follow:

The $C_1$ to $C_{18}$ alcohols can be branched or unbranched, saturated, aliphatic, aromatic, primary, secondary, or tertiary alcohols, preferably monohydric alcohols, but including ether alcohols. Particularly preferred are polyhydric alcohols of 2 to 6 hydroxy groups as well as amino alcohols. Examples include methanol, isopropanol, $C_8$ Oxo alcohol, lauroyl alcohol, benzyl alcohol, ethylene glycol, monododecyl ether of triethylene glycol, glycerol, pentaerythritol, glucose, dipentaerythritol, sorbitol, Cellosolve, Carbitol, diethanolamine, etc.

The $C_1$ to $C_{18}$, preferably $C_2$ to $C_{12}$ monobasic acids, can be branched or unbranched, saturated, aliphatic, monocarboxylic acids, preferably the saturated fatty acids, such as acetic acid, butyric acid, caproic acid, lauric acid, etc.

The $C_1$ to $C_{18}$ amines can be branched or unbranched saturated, aliphatic, primary or secondary amines, containing 1 to 8 nitrogens, preferably mono or diamines, such as ethyl amine, butylamine, sec. butylamine, diethylamine, etc., but including higher polyamines such as alkylene polyamines, wherein pairs of nitrogen atoms are joined by alkylene groups of 2 to 4 carbon atoms. Thus, polyamines of the formula: $NH_2(CH_2)_n$—$[NH(CH_2)_n]_m$—$NH_2$ are included where n is 2 to 4 and m is 0 to 6. Examples of such polyamines include tetraethylene pentamine, tripropylene tetramine, N-aminoalkyl piperazines, e.g., N-(2-aminoethyl) piperazine, N,N'-di(2-aminoethyl) piperazine, etc. Particularly preferred are the $C_4$ to $C_{18}$ N,N-dialkylamino alkylene diamines such as N,N-dimethyl-1,3-propanediamine, etc. Also, preferred is tetraethylene pentamine, as well as corresponding commercial mixtures such as "Polyamine H", and "Polyamine 500".

The $C_2$ to $C_{18}$ amides can be monoamides made from the above amines and monobasic acids with the total number of carbon atoms in the amide in the range of 2 to 18 carbons.

The alkyl phenols or thiophenols are those with 1 to 4 alkyl groups, preferably averaging 1 to 2 alkyl groups, wherein the alkyl groups each contain 1 to 12 carbon atoms which can be straight chain or branched chain, such as cresol, n-octyl phenol, di-n-octyl phenol, monoisobutyl thiophenol, etc.

The $C_1$ to $C_{18}$ alkyl mercaptans can have branched or straight chain alkyl groups, and include ethyl mercaptan, n-octyl mercaptan, iso-octyl mercaptan, lauryl mercaptan, etc.

Usually from 0.1 to 1 molar proportion of said functional reagent will be reacted per molar proportion of epoxide present in the terpolymer. In the case of polyfunctional reagents, such as polyamines or polyols, then preferably 0.5 to 1.0, e.g., 0.8 to 1.0 molar proportion of said polyfunctional reagent is used in order to minimize cross-linking between polymer chains and thus minimize formation of oil-insoluble portions. Of course, with a lower molecular weight terpolymer, and/or with a low proportion of epoxide groups in the terpolymer, such cross-linking may not be a problem thus permitting the use of a relatively low molar proportion of the polyfunctional reagent, e.g., tetraethylene pentamine, relative to the molar proportion of epoxide groups which are present. On the other hand, with a high molecular weight starting terpolymer, and/or a terpolymer with a high proportion of epoxide groups present, then a relatively large molar proportion or even an excess molar proportion, e.g., 10% excess, of the polyfunctional reagents will generally be desirable to prevent excessive cross-linking and possible gelling and oil-insolubility. In any case, the desired end product is an oil-soluble product, e.g., at least 0.1 wt. % soluble in conventional mineral lubricating oil.

Various mixtures in any proportion of functional reagents outlined above, may be reacted with the epoxidized terpolymer, e.g., mixtures of alcohol and amine, etc. In addition, any of the above functional agents, may also have other substituents, which substituents do not react with the oxirane groups, and which do not interfere with the reaction of the functional group with the oxirane groups.

The reaction product of this invention can be incorporated in lubricating oil compositions, e.g., automotive crankcase oils, in concentrations within the range of about 0.1 to about 10, e.g., 0.1 to 3, weight percent based on the weight of the total compositions. The lubricating oils to which the additives of the invention can be added include not only mineral lubricating oils, but synthetic oils also. Synthetic hydrocarbon lubricating oils may also be employed, as well as nonhydrocarbon synthetic oils, including dibasic acid esters such as di-2-ethyl hexyl sebacate, carbonate esters, phosphate esters, halogenated hydrocarbons, polysilicones, polyglycols, glycol esters such as $C_{13}$ oxo acid diesters of tetraethylene glycol, etc. When used in gasoline or fuel oil, e.g., diesel fuel, No. 2 fuel oil, etc., then usually about 0.001 to 0.5 wt. %, based on the weight of the total composition of the reaction product will be used. Concentrates comprising a minor proportion, e.g., 10 to 45 wt. %, of said reaction product in a major amount of hydrocarbon diluent, e.g., 95 to 55 wt. % mineral lubricating oil, with or without other additives present, can also be prepared for ease of handling.

In the above compositions or concentrates, other conventional additives may also be present, including dyes, pour point depressants, antiwear agents, e.g., tricresyl phosphate, zinc dialkyl dithiophosphates of 3 to 8 carbon atoms, antioxidants such as phenyl-alpha-naphthylamine, tert. octylphenol sulfide, bis-phenols such as 4,4'-methylene bis(2,6-di-tert. butylphenol), viscosity index improvers such as the ethylene-higher olefin copolymer, polymethacrylates, polyisobutylene, alkyl fumarate-vinyl acetate copolymers, and the like as well as other ashless dispersants or detergents.

While the above has described the invention in considerable detail, the following examples more fully describe the invention and illustrate the advance over the prior art.

EXAMPLE 1

Thirty grams of an ethylene-propylene-5-ethylidene-2-norbornene terpolymer containing 49 percent by weight of ethylene, 47.5 percent by weight of propylene, 3.5 percent by weight of 5-ethylidene-2-norbornene and a viscosity average molecular weight ($\overline{M}_v$) of 150,000 was dissolved in 800 ml. of chloroform contained in a 1 liter flask fitted with a stirrer, dropping funnel and thermometer. A solution of 1.96 grams of meta-chloroperbenzoic acid (85% purity) in 40 ml. of chloroform was added dropwise to the stirred polymer solution over the course of one-half hour. During the addition, the temperature of the reaction mixture rose from 25° C. to 28° C. indicating reaction. The homogeneous solution was allowed to stand overnight (16 hours) and was then poured in a slow stream into 4 liters of methanol with rapid stirring. The precipitated product was filtered on a Buchner funnel, washed with a further quantity of methanol and dried under vacuum. The dried product weighed 29.2 grams (some mechanical loss) and exhibited a strong absorption band at 8.0 microns and two moderate adsorption bands at 11.2 and 12 microns when examined by infrared spectroscopy, showing the presence of oxirane functionality. Analysis showed an oxygen content of 0.55 wt. percent.

EXAMPLE 2

The experimental procedure of Example 1 was repeated with 30 grams of a terpolymer containing 45 percent by weight of ethylene, 46 percent by weight of propylene, 9.0 percent by weight of 5-ethylidene-2-norbornene and a $\overline{M}_v$ of 165,000. 5.02 grams of the meta-chloroperbenzoic acid dissolved in 50 ml. of chloroform was added to the terpolymer dissolved in 800 ml. of chloroform. The epoxidized terpolymer was worked up and isolated in the same manner as the product in Example 1. The product weighed 27.6 grams, exhibited absorption at 8.0, 11.2 and 12 microns by infra-red analysis and had an oxygen content of 1.15 percent by weight.

EXAMPLE 3

Three grams of the epoxidized product of Example 1 was mixed with 0.50 gm. of N,N-dimethyl-1,3-propanediamine, 0.004 gm. of p-toluene sulfonic acid and 50 ml. of 1,2,4-trichlorobenzene in a 200 ml. flask fitted with a reflux condenser and nitrogen purge line. The mixture was heated under nitrogen for 7 hours at a temperature of 170°–175° C., cooled to room temperature and worked up in methanol. Purification was attained by re-solution in toluene and reprecipitation in methanol. Analysis of the dried product, which weighed 2.68 grams showed a nitrogen content of 0.16 weight percent.

EXAMPLE 4

The procedure of Example 3 was repeated with the product of Example 2. Three grams of the epoxidized product of Example 2, 1.0 gm. of N,N-dimethyl-1,3-propanediamine, 0.004 grams of p-toluene sulfonic and 50 ml. of 1,2,4-trichlorobenzene were heated for 7 hours at 170°–175° C. under an atmosphere of nitrogen. Reprecipitated dry product weighed 2.69 grams and showed on analysis a nitrogen content of 0.20 weight percent.

EXAMPLE 5

The epoxidized terpolymer products of Examples 1 and 2 and the functional adducts of Examples 3 and 4 were made up as 10 wt. percent concentrates in Solvent 150 Neutral Oil which is a solvent extracted, neutral, paraffinic oil having a viscosity of 150 SUS at 100° F. as determined by ASTM-D-567.

Aliquots of the concentrates were dissolved in a used automobile crankcase mineral lubricating oil and tested for ability to maintain sludge in a dispersed state by means of a sludge inhibition bench test.

The concentrations used are shown in Table I. After dissolving the epoxidized polymers the samples were heated at 280° F.±2° F. for 16 hours. After this length of time the amount of sludge that is not dispersed by the additive was measured by centrifuging the samples at 2000 rpm. for 30 minutes. The oil was carefully decanted from the sludge and the sludge was then washed twice with 25 cc. of n-pentane. After washing, the sludge was dried at room temperature to constant weight (about 1 hour). Blanks were also run on used oil containing no additive to determine total sludge. The percentage of sludge dispersed by the additives were then calculated as set forth in Table I.

TABLE I

| Polymer | Concentration gms. Polymer/10 gms. Used Oil | Percent Sludge Dispersed |
|---|---|---|
| Polymer of Example 1 | 0.02 | 38 |
| " | 0.04 | 39 |
| " | 0.06 | 53 |
| " | 0.10 | 59 |
| Polymer of Example 2 | 0.02 | 69 |
| " | 0.04 | 75 |
| " | 0.06 | 72 |
| " | 0.10 | 77 |
| Polymer of Example 3 | 0.01 | 60 |
| " | 0.02 | 85 |
| Polymer of Example 4 | 0.01 | 89 |
| " | 0.01 | 93 |
| " | 0.02 | 88 |
| " | 0.025 | 92 |

TABLE I-continued

| Polymer | Concentration gms. Polymer/10 gms. Used Oil | Percent Sludge Dispersed |
| --- | --- | --- |
| " | 0.05 | 83 |

These data show the effectiveness of the instant polymers in dispersing sludge as no sludge is dispersed without the additive.

The functional adducts of the epoxidized polymers, prepared in Examples 3 and 4 were tested as viscosity index improvers in Solvent 150 Neutral Oil, which is a conventional mineral lubricating oil. The results are shown in Table II.

TABLE II

Thickening Efficiency of Functional Adducts

| | Thickening Efficiency[1] |
| --- | --- |
| Product of Example 3 | 1.9 |
| Product of Example 4 | 2.7 |

(1) Thickening efficiency is defined as the ratio of the weight percent of Enjay Chemical Co. Paratone N (a polyisobutylene of $\overline{M}_v$ 125,000 as determined in diisobutylene at 20° C. according to the relationship $[\eta] = 36 \times 10^{-5} \times \overline{M}_v^{0.64}$ required to thicken Solvent 150 Neutral Oil to a viscosity of 12.4 centistokes at 210° F. to the weight of the experimental polymer required to thicken the same oil to the same viscosity at the same temperature.

As seen by the above example, oil soluble epoxidized terpolymers, or their functional adducts, of the invention can be made as automotive crankcase oil dispersants and can also be effective in neutralizing acidity in lubricants in which they are compounded.

The epoxidized terpolymers and their functional adducts are compatible with and form substantially haze-free solutions at effective concentrations in the range of 0.1 to 10 weight percent in neutral oils which are herein defined as paraffinic or naphthenic distillate lubricating oils which have viscosities in the range of 50 to 1000 SUS at 100° F. or are synthetic lubricants, particularly of the ester type. The neutral oils may have been refined by any of the procedures well known to those having skill in the art and may be further compounded with antioxidants, oiliness agents and the like as hereinbefore indicated.

What is claimed is:

1. A mineral oil soluble adduct of an epoxidized terpolymer useful in a lubricating oil or a fuel oil as a sludge dispersing additive, said adduct consisting of the reaction product of: (a) terpolymer having a molecular weight in the range of 10,000 to 1,000,000 viscosity average molecular weight and consisting of in the range of about 30 to 85 mole percent ethylene, about 14.5 to about 69.5 mole percent of a $C_3$ to $C_8$ alpha monoolefin, and about 0.5 to about 20 mole percent of a $C_5$ to $C_{14}$ non-conjugated alicyclic diolefin, wherein about 10 to 100% of the double bonds in the terpolymer have been epoxidized; and (b) a molar proportion of an amine, selected from the group consisting of $C_4$ to $C_{18}$ N,N-dialkylamino alkylene diamine and polyamine of the formula:

$$NH_2(CH_2)_n [NH(CH_2)_n]_m NH_2$$

wherein n is 2 to 4 and m is 0 to 6, per molar proportion of epoxide in said epoxidized terpolymer.

2. An adduct according to claim 1, wherein said terpolymer is a terpolymer of about 40 to 70 mole percent ethylene, about 20 to 58 mole percent propylene and about 2 to 10 mole percent of 5-ethylidene-2-norbornene.

3. An adduct according to claim 2, wherein said amine is N,N-dimethyl-1,3-propylene diamine.

* * * * *